United States Patent [19]
Morteyrol

[11] Patent Number: 5,861,079
[45] Date of Patent: Jan. 19, 1999

[54] TRANSFER RING FOR A TIRE FOR TIRE BELT

[75] Inventor: Jean-Louis Morteyrol, Cebazat, France

[73] Assignee: Compagnie Generale des Etablissements Michelin - Michelin & Cie, Clermont-Ferrand Cedex, France

[21] Appl. No.: 878,874

[22] Filed: Jun. 19, 1997

[30] Foreign Application Priority Data

Jun. 19, 1996 [FR] France .................................. 96 07721

[51] Int. Cl.$^6$ .................................................. B29D 30/26
[52] U.S. Cl. ...................................... 156/406.2; 156/396
[58] Field of Search .................... 156/406.2, 126, 156/127, 111, 396; 249/160; 92/21 R, 22, 28, 37, 15

[56] References Cited

U.S. PATENT DOCUMENTS

| | | | |
|---|---|---|---|
| 3,151,013 | 9/1964 | Nebout | 156/406.2 |
| 3,918,346 | 11/1975 | Ziegler | 92/28 |
| 4,148,681 | 4/1979 | Collins et al. | 156/406.2 |
| 4,239,565 | 12/1980 | Henley et al. | |
| 4,474,399 | 10/1984 | Lauber | |
| 4,608,219 | 8/1986 | Singh et al. | |
| 4,634,489 | 1/1987 | Dupommier | 156/406.2 |
| 5,380,384 | 1/1995 | Tokunaga et al. | |

FOREIGN PATENT DOCUMENTS

| | | | |
|---|---|---|---|
| 2109564 | 9/1972 | Germany | |
| 7612385 | 5/1977 | Netherlands | 156/406.2 |
| 852632 | 8/1981 | U.S.S.R. | 156/406.2 |
| 2092100 | 8/1982 | United Kingdom | |

Primary Examiner—Geoffrey L. Knable
Attorney, Agent, or Firm—Baker & Botts, L.L.P.

[57] ABSTRACT

The present invention relates to a transfer ring (1) for a tire or tire belt having grippers (5) distributed along its circumference which are displaceable radially so as to come into contact with said tire or belt, and having means (8) for controlling the radial displacement of said grippers and means (15) for immobilizing the grippers (5) by blocking them perpendicular to their radial displacement.

20 Claims, 6 Drawing Sheets

TRANSFER RING FOR A TIRE FOR TIRE BELT

BACKGROUND OF THE INVENTION

The present invention relates to a transfer ring for a tire assembling machine.

In the tire industry, it is current practice to produce a tire carcass including essentially the entire carcass with the exception of the outer annular reinforcements and the tread which form a belt which is to be positioned precisely on said carcass. This belt is produced separately; in fact, due to its geometry and its positioning on the outer annular surface of the carcass it is preferable to grasp the belt on its outer annular surface, in order to transfer it. For this, there is generally used a transfer ring provided with means for grasping the outer circumference of the belt, this transfer ring being able also to make it possible to displace then the complete tire produced.

This transfer operation is of great importance in the manufacture of the tire. In fact, the tires must be balanced, which means a precise positioning of the components of the tire, on the one hand, uniformly on the circumference of the tire and, on the other hand, symmetrically with respect to the radial median plane of the tire. Furthermore, the slight rigidity of the ring formed by the belt in raw state requires careful transfer in order not to run the risk of deforming it when it is grasped.

EP-A 0 700 774 describes a transfer ring for a tire belt formed of two coaxial annular disks, one of which, the inner one, is stationary, while the other, the outer, is movable in rotation around the axis of the ring. This transfer ring has grippers connected respectively to each of the disks by a rod so that the rotation of the outer disk results in a radial displacement of the grippers in order grasp the belt, said rotation being effected by means of an actuator located radially to the outside of the outer disk.

Such a transfer ring makes it possible to grasp belts of different diameters. However, this characteristic is accompanied by a very large radial size. Now, it is current practice that transfer rings, upon the placing of the belt, must be positioned between the support bearing the carcass and a roller device used in order to effect good application of the belt onto the carcass. This considerably limits the outer radial space permissible for the transfer ring.

U.S. Pat. No. 4,667,574 describes a transfer ring for a tire belt comprising grippers which are displaceable radially in order to grasp the belt, and are driven respectively by a pneumatic actuator. By a piston housed in the body of the gripper in question an actuator controls the radial displacement of said gripper up to a piston-stop position corresponding to the definition of the diameter of the belt to be grasped.

Such a transfer ring can therefore only be one-dimensional. Furthermore, the actuators used for this ring exert a relatively substantial pressure on the belt upon its transfer so that there is a danger of deforming said belt.

Furthermore, in the two documents mentioned the transfer rings disclosed require a very precise adjustment of coaxiality with respect to the form which initially bears the belt and to the assembly support on which it is to be placed. In fact, in order to permit a proper grasping of the belt, the diameter defined by the position of the grippers must be perfectly centered on said belt.

Publication GB-A-2 092 100 is distinguished from the publication U.S. Pat. No. 4,667,574 previously cited by the fact that the displacement of the grippers is stopped by a device for blocking the piston rod in a direction perpendicular to the radial displacement of said rod. This device makes an independent displacement of each gripper possible, but it requires not only actuators with a rod which take up a lot of space but also the presence of blocking devices (14) which further increase the space taken up radially. The multi-dimensional character of such a transfer ring is therefore limited to very slight differences in diameter. Furthermore, as indicated in connection with the device disclosed in U.S. Pat. No. 4,667,574, the operating pressure of the type of actuator used for this ring is problematical.

SUMMARY OF THE INVENTION

The object of the invention is a transfer ring for a tire belt or a tire which is multi-dimensional and takes up only a slight radial space.

In accordance with the invention, the transfer ring for a tire or tire belt comprises grippers distributed along its circumference and displaceable radially in order to come into contact with the said tire or belt, and it comprises means for controlling the radial displacement of said grippers as means for immobilizing the grippers by blocking them perpendicular to their radial displacement, said immobilizing means acting directly on the grippers.

Such immobilizing means are therefore independent of the grippers and do not act as stops. They permit a blocking of the grippers whatever the radial position thereof, without taking up additional radial space.

In accordance with a special embodiment of the invention, the immobilizing means comprise gripper clamping means distributed in two circumferential sets, laterally on each side of the grippers, the elements of the two sets facing each other. Each clamping element is displaceable towards a gripper perpendicularly to the radial displacement of the latter. These clamping elements are advantageously formed by clamping plates.

This arrangement assures good stability and rigidity in position for the grippers.

For the purpose, in particular, of permitting a certain flexibility in the adjustment of the positioning of the transfer ring within the assembling machine and of limiting the risks of deformation of the belt or the tire to be grasped, each gripper has an actuating means of its own which permits radial displacement of any stroke independently for each gripper.

Guide means for the grippers are advantageously arranged laterally with respect to said grippers. This contributes to the compactness of the transfer ring, preserving the small radial size.

For this same purpose, an object of the invention is a transfer ring for a tire or tire belt, comprising grippers distributed along its circumference which are displaceable radially in order to come into contact with said tire or belt, and means for immobilizing the grippers, each gripper having an actuating means of its own formed of a bellows actuator.

DESCRIPTION OF THE DRAWINGS

Other features and advantages of the invention will become evident from the reading of an embodiment of a transfer ring in accordance with the invention, with reference to the drawings, in which.

DESCRIPTION OF PREFERRED EMBODIMENTS

Figure 1:
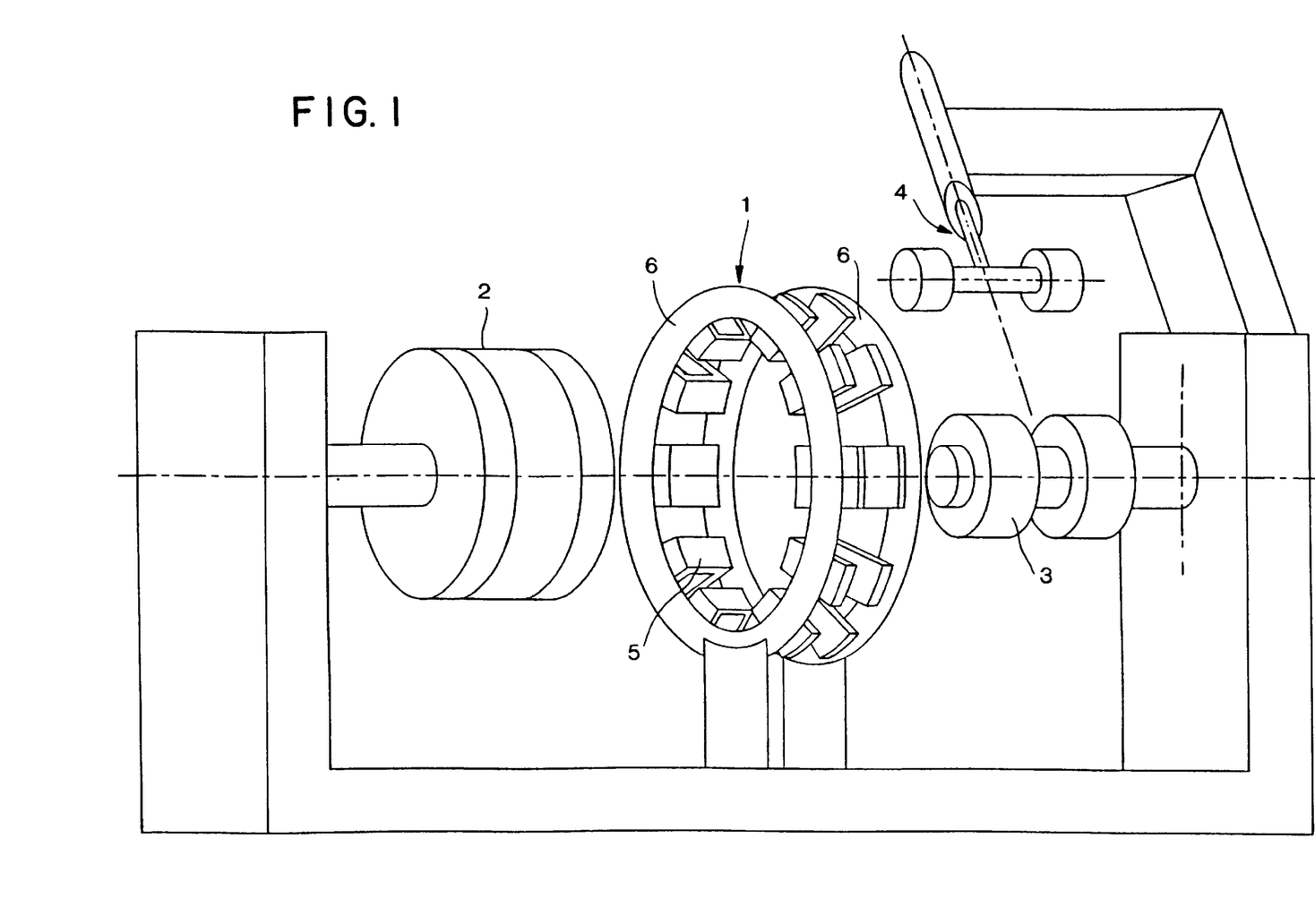
FIG. 1 is a perspective diagrammatic showing of the arrangement of a transfer ring within an assembling machine.

Referring to FIG. 1, the transfer ring 1 forms part of an assembling machine comprising a deflatable annular form 2, on which the tire belt is built, adjusted in order to be coaxial with a drum 3 on which the carcass which is to receive the belt is positioned. On top of this drum 3 there is a roller device 4 which, once the belt is in place on the carcass, makes it possible to apply the edges of said belt properly onto it.

Between the drum 3 and the form 2, the transfer ring 1 is slidably mounted on rails located on the floor (not shown), which ring, while having an inside diameter greater than the form 2 in order to effect the grasping of the belt, must have an outside diameter which is sufficiently small to pass between the drum 3 and the roller device 4.

The transfer ring 1 has adjoining sectors each of which bears a gripper 5. The transfer ring 1 preferably has ten sectors so as to effect a good grasping of the belt without the necessity of too many grippers. The ten grippers 5 of the transfer ring are distributed uniformly along its circumference. A transfer ring in accordance with the invention could, of course, have a different number of sectors.

Figure 2:
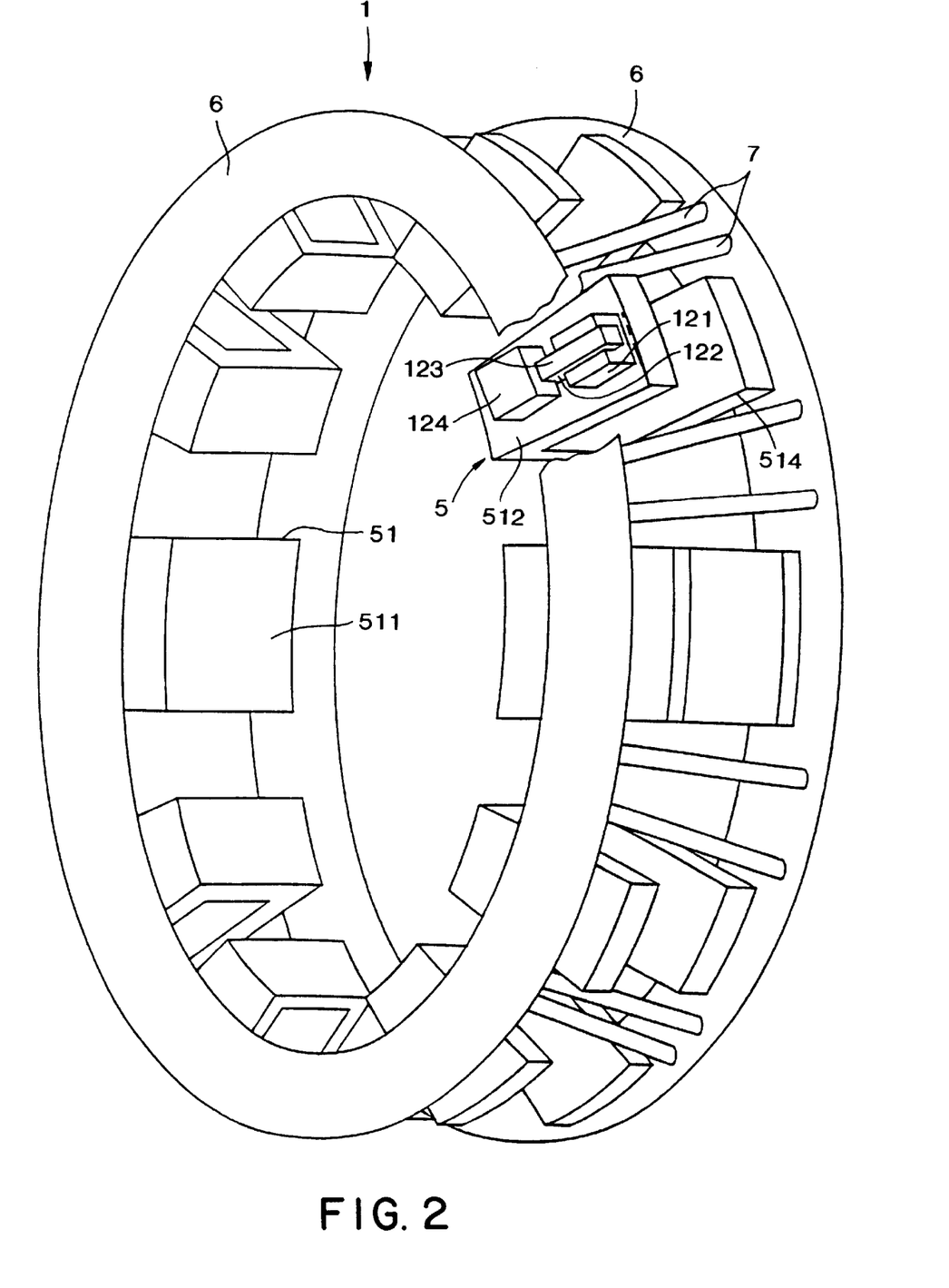
FIG. 2 is a diagrammatic view in perspective of the transfer ring shown in FIG. 1.

As shown in FIG. 2, the transfer ring 1 comprises two parallel, identical, coaxial annular disks 6 which constitute its basic structure. These disks 6 define the sidewalls of the ring and are firmly attached to each other by the connecting rods 7 which are spaced uniformly over the circumferences of the disks 6, each of the ends of a rod being fastened to one of the disks. For reasons of symmetry, each sector comprises two connecting rods 7 so that the connecting rods are spaced uniformly along the periphery of the ring 1.

It will be noted that the diagrammatic perspective view of FIG. 2 does not show all of the elements constituting the transfer ring, in order not to encumber it.

Figure 4:
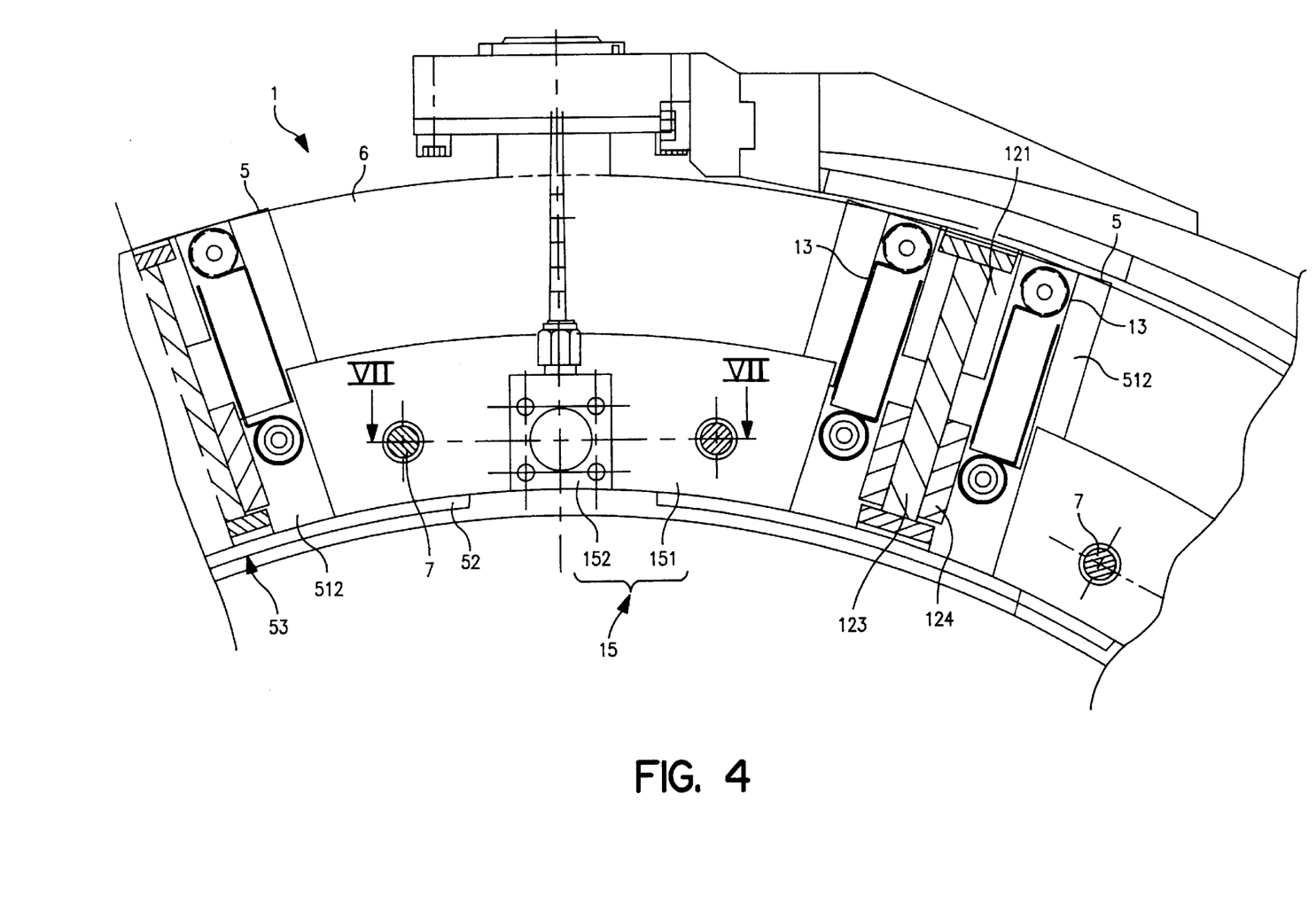
FIG. 4 is a partial sectional view through the transfer ring along the arrows IV of FIG. 3.
Figure 5:
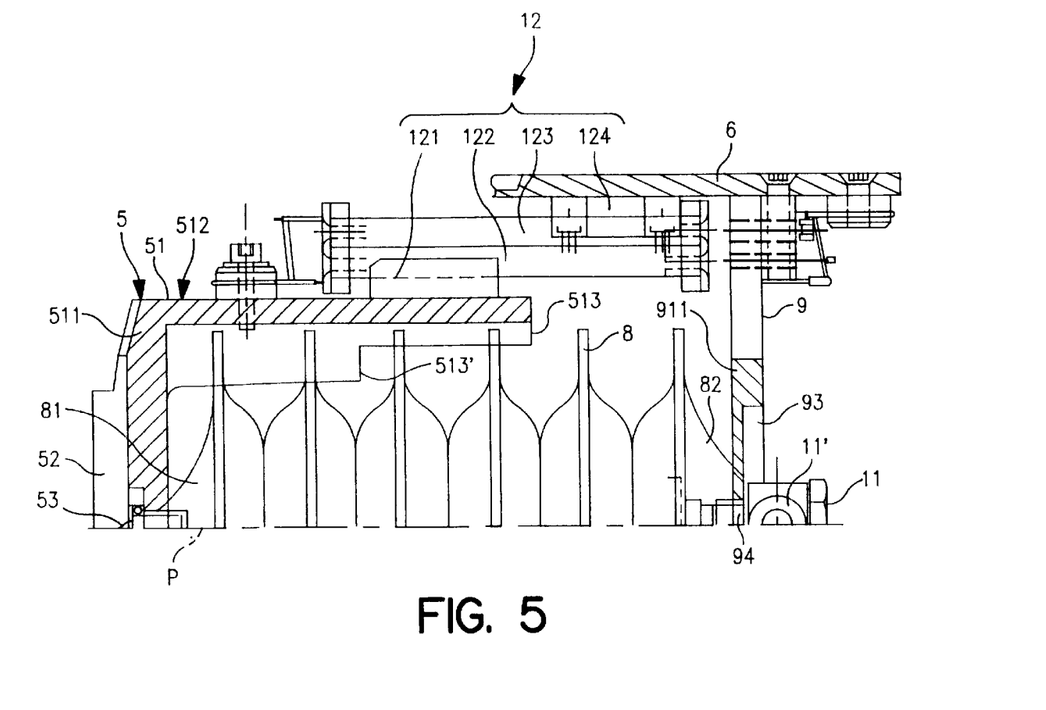
FIG. 5 is a partial sectional view of the gripper of FIG. 3, along the arrows V, in the spread-apart position of said gripper.

FIG. 5 shows merely a partial section through a gripper 5, the latter being symmetrical with respect to the plane P. It is seen that the grippers 5 are formed by a hollow body 51, having the shape of a box of U-shape open towards the outside of the transfer ring 1 and possessing:

- a rectangular end wall 511 bearing on the outside an element 52 for grasping the ring having a concave shape so as to fit the shape of said belt and obtain a larger contact surface, as shown in FIG. 4. One can possibly provide at its center a thin peak 53 of very slight length in order to contribute to the grasping; and
- opposite side walls 512 and 514 parallel to the disks 6 of the transfer ring 1, their respective side edges being extended by flanges 513, 515 perpendicular to said walls.

The grippers 5 are mounted on the disks 6 respectively via a stationary end plate 9 connected to the body 51 by an actuator 8 one end 81 of which is fastened to the inner face of the end wall 511 and the other end 82 of which is fastened to the end plate 9. The body 51 can thus be displaced radially with respect to the stationary end plate 9 by means of the actuator 8.

Figure 3:
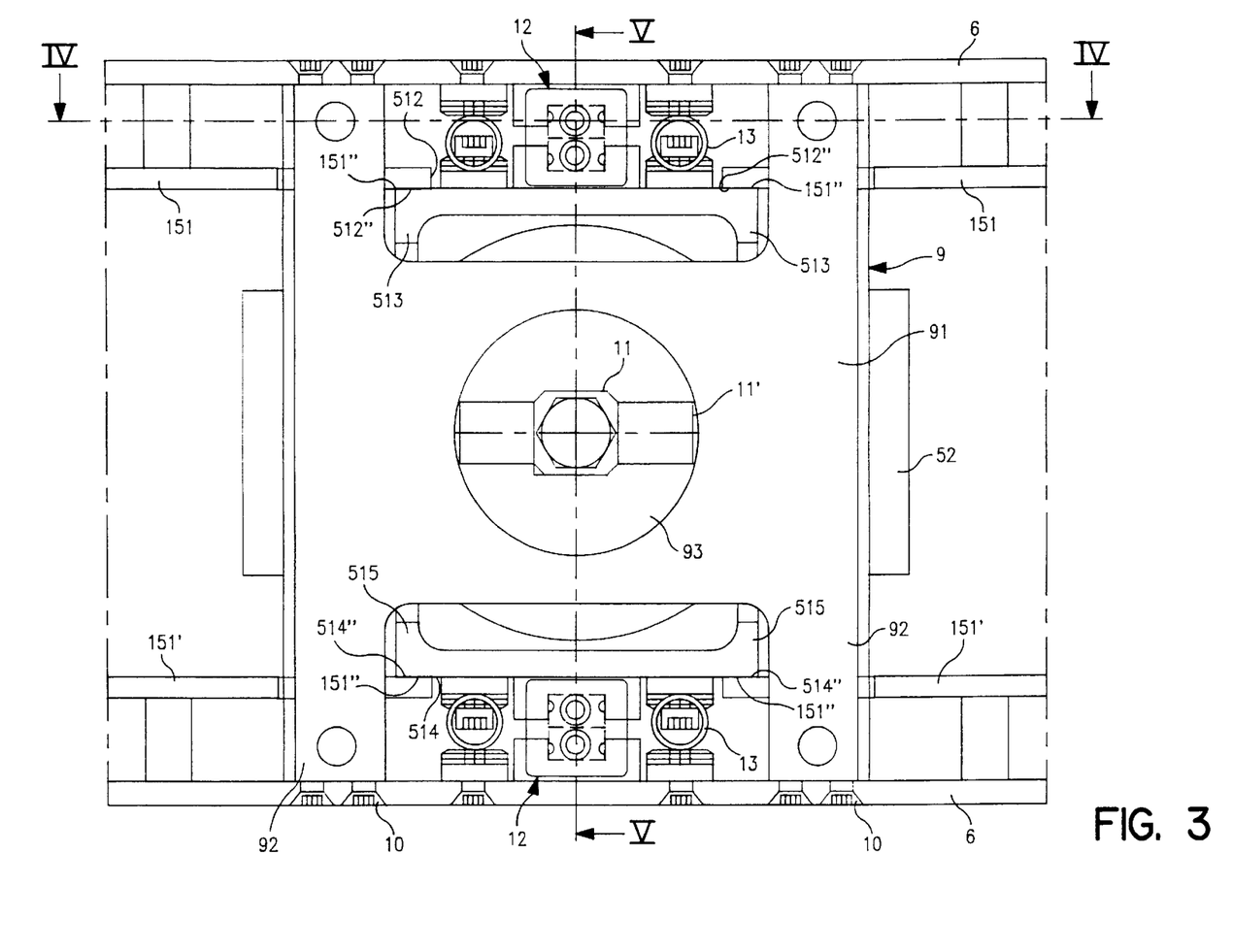
FIG. 3 is a partial top view of a gripper of the transfer ring shown in FIG. 2.

As shown in FIGS. 3 and 5, the end plate 9 has a central zone of substantially rectangular shape 91, the ends of which are extended by plugs 92 for connection with the disks 6 by means of screws 10. The zone 91 bears at its center a recess 93 pierced by a hole 94 for the passage of a means 11 for fastening the end 82 of the actuator 8 on the face 911 of the end plate 9, on the inside of the gripper, and for feeding said actuator with air by means of the opening 11'.

Each of the flanges 513 and 515 furthermore bears a shoulder, namely 513' in the case of the flange 513, the shoulder of the flange 515 not being visible in the figures. These shoulders cooperate, in the position of rest of the grippers 5, with the zone 91 so as to limit the stroke of the grippers towards the outside of the ring 1.

The actuators 8 are fed with air by tubes, not shown, connected respectively to the openings 11' which are all connected to the same feed source. In order that the ascent of the actuators under pressure is uniform, one can, for example, use several feed sources arranged along the circumference of the ring.

Each gripper 5 is thus mounted between the two disks 6. Furthermore, each gripper is connected to these disks 6 via guide means 12, described in the following description, which assure the following of the path of displacement of the said grippers.

This individual actuation and displacement of each gripper 5 imparts to these grippers the possibility of adopting a slightly different radial position from each other upon the grasping of the belt and the holding of it. In fact, at the time of the belt "grasping step", the advance of each gripper 5 is stopped by its contact with the belt, the latter being held, at this stage, radially by its manufacturing form 2.

This characteristic makes it possible to accommodate for a lack of coaxiality between the transfer ring 1 and the assembly consisting of the form 2 and drum 3. This means that the precision of this adjustment of coaxiality between the transfer ring 1 and the assembly, consisting of form 2 on the one hand and drum 3 on the other hand, may be less than the precision necessary for the adjustment between the form 2 and the drum 3. This aspect is all the more advantageous since, as seen previously, the transfer ring 1 is movable in translation, which can result in the appearance of differences from the initial adjustment at the end of a certain number of displacements. One can therefore tolerate these differences here up to a certain limit, which will make it possible to limit the number of adjustments to be effected and to facilitate the effecting thereof.

In accordance with FIG. 5, the guide means 12 are mounted for each gripper 5 symmetrically and on the outside with respect to said gripper on each of its sidewalls 512 and 514. As the guide means 12 corresponding to the two walls 512 and 514 of the grippers are identical, these means will be described for only one of these walls.

The guide means 12 connected to the sidewall 512 are formed by two rails 122 and 123 arranged with their respective end walls side by side, within which there slide a first shoe 121 rigidly fastened on the wall 512 and a second shoe 124 rigidly fastened on the disk 6 close to said wall, these attachments being effected by screws, not shown in the drawing. The sidewall 512 therefore slides along one of the disks 6. The same is true, at the same time, of the sidewall 514 along the other disk 6, thus permitting the guidance of the body 51 of the gripper 5.

This arrangement permits the body 51 to have a stroke corresponding to the sum of the stroke of each of the shoes, and therefore a very limited size with respect to the stroke obtained.

Each of the walls 512, 514 also bears at least one return spring 13 for return to its position of rest, as shown in FIG. 3.

In order to produce a multi-dimensional ring accepting diameters which vary up to about 100 mm between the minimum and the maximum while still being of small size, it is of interest to use bellows actuators which make it possible to obtain a much larger stroke than a conventional pneumatic actuator for an equivalent initial size at rest. Furthermore, such actuators operate at pressures less than one bar, which avoids the risk of deforming the belt, even by pinching between the grippers 5 and the form 2, due to too great a pressure of the grippers on said belt.

In accordance with one aspect of the invention, the transfer ring 1 has means for blocking the grippers whatever the position of radial advance of the grippers, without increasing the radial size of the transfer ring.

The transfer ring 1 of the invention comprises radial immobilizing means 15 for the grippers 5. These immobilizing means 15 effect a blocking of the grippers 5 perpendicular to their radial displacement, which makes it possible to obtain an embodiment which is multi-dimensional (or accepts several dimensions) and compact at the same time.

As shown in FIGS. 3 and 4, the immobilizing means 15 comprise clamping elements 151, 151' such as plates. These clamping elements 151, 151' are distributed in two circumferential sets, parallel to the disks 6, on both sides of the grippers 5, the plates 151 of the first set facing the plates 151' of the second set.

A variant embodiment of the invention which consists therein that the clamping plates are distributed, perpendicular to the disks 6, on both sides of the grippers 5 can also be contemplated, although it is more complicated to realize.

In this variant, it is also necessary for the displacement of the plates towards the grippers to be perpendicular to the radial displacement of the grippers.

Here, the circumferential set of clamping plates 151 is therefore located between the sidewall 512 and the disk 6 which is closest to it, and symmetrically to the set of clamping plates 151' between the sidewall 514 and the other disk 6. The plates 151, 151' are connected respectively to the disks 6 by their sliding mounting on the connecting rods 7 due to passage holes 7' made in said plates, cooperating with the connecting rods 7. The connecting rods 7 make it possible to guide the movement of the clamping plates 151, 151' which are actuated by the maneuvering actuators 152, 152' which permit the axial displacement of the said clamping plates towards the grippers 5.

Figure 7:
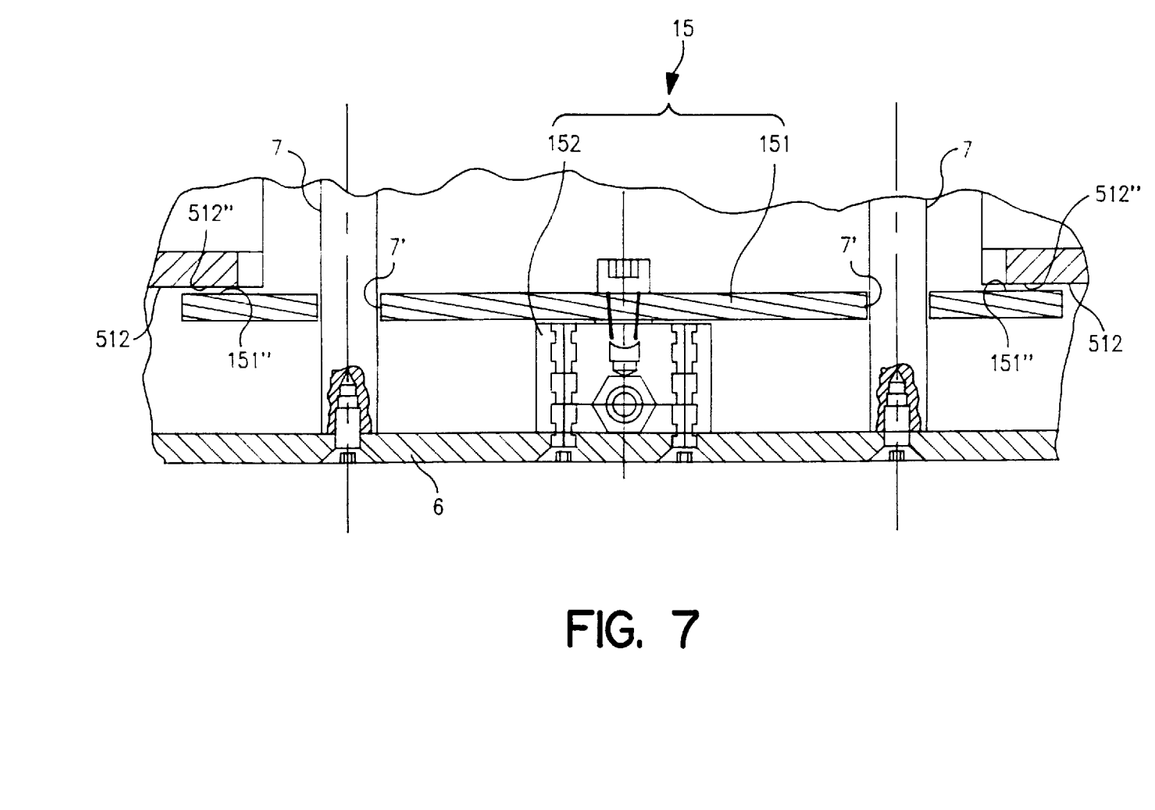
FIG. 7 is a partial sectional view through the transfer ring along the arrows VII of FIG. 4.

Each of the sidewalls 512, 514 of the grippers 5 bears on the outside at least one surface of contact with a clamping plate. In particular, as shown in FIGS. 3 and 7, each of the sidewalls 512 (514) of the grippers 5 bears on the outside two surfaces 512" (514") for contact with two consecutive clamping plates 151 (151'), respectively, the two contact surfaces 512" (514") of the same wall 512 (514) being located at each of the radially opposite ends of said wall. Each clamping plate 151 (151') also bears, on the inside with respect to the ring 1, two contact surfaces 151" (151") with two contact surfaces 512" (514") borne, respectively, by two consecutive grippers 5. In order to obtain larger contact surfaces, the plates 151, 151' are in the form of portions of an annular disk. There is thus obtained a blocking by clamping of the grippers 5.

This arrangement makes it possible, on the one hand, to leave accessible for the guide means 12, which are therefore arranged parallel to the clamping plates 151, 151', the outer central portion of the sidewalls 512 and 514 and, on the other hand, to assure additional circumferential rigidity. It is then advantageous, for reasons of symmetry and efficiency, to arrange two springs 13 on each wall on opposite sides of the guide means 12, as shown in FIGS. 3 and 4.

This system for blocking in position and maintaining of the grippers 5 is thus fixed radially and act whatever the radial position of said grippers. Of course, for this purpose it is necessary that the clamping plates 151, 151' be in contact with the sidewalls 512 and 514 of the grippers 5 even when said grippers are in their position of maximum stroke. It is therefore of interest that the clamping plates 151, 151' be located in the vicinity of the inside diameter of the disks 6 without exceeding it, in order not to increase the space taken up radially. The inside and outside diameters of the disks 6 are advantageously selected in such a manner as to correspond substantially to the radial size of the grippers 5 in position of rest.

It is also necessary that the height of the walls 512, 514 be greater than the maximum stroke of the grippers 5. In this case, even in position of maximum displacement of the grippers, a part of the sidewalls 512 and 514 will remain in the volume within the disk 6 and therefore the surfaces 512" and 514" of contact with the clamping plates will not be zero. These dimensions can be optimized in order to obtain contact surfaces which permit an effective blocking.

The operation of the transfer ring 1 will be briefly described below.

Figure 6:
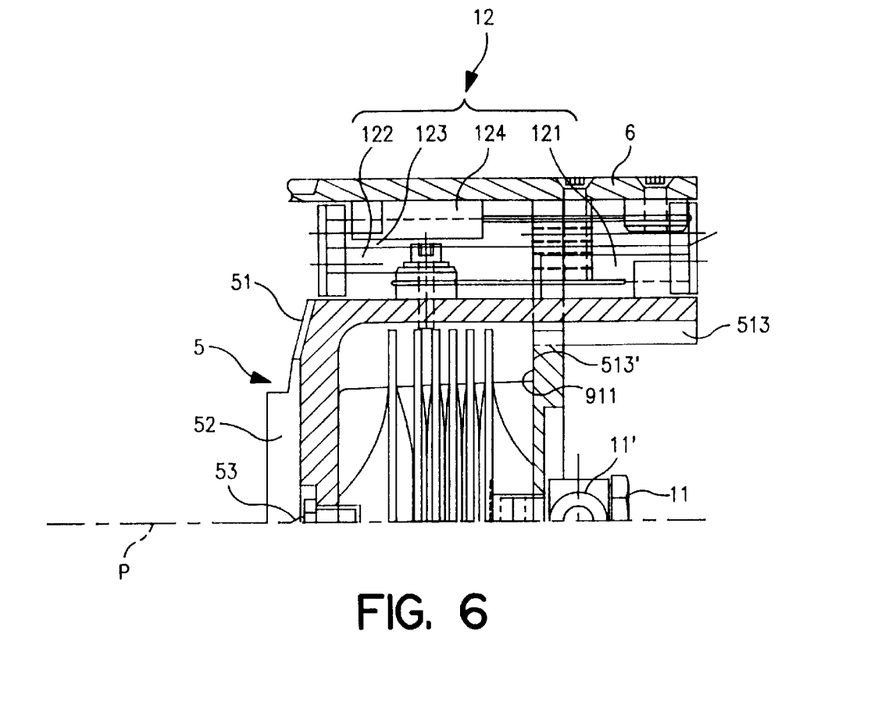
FIG. 6 is a partial sectional view comparable to that of FIG. 5, except that the gripper is in its position of rest.

The transfer ring 1 is advanced towards the form 2 until it is positioned correctly around said form. In this position, the actuators 8 are at rest, as shown in FIG. 6, and the grippers are then at the maximum distance apart from each other. The clamping plates 151, 151' are also spread apart with respect to said grippers.

The feeding of the actuators 8 with air is then placed in operation and the respective chambers of these actuators 8 start to be deployed. This deployment results in the radial displacement towards the inside of the ring 1 of the body 51 of each gripper 5, the sidewalls 512 and 514 sliding due to the guide means 12 respectively. This displacement will be described for one of the walls 512 of a gripper 5 with the understanding that the guide means act symmetrically and in identical manner for both walls.

First of all, the rail 123 moves, sliding on the shoe 124 fastened rigidly on one of the disks 6, thus permitting the advance of the wall 512. Then, when the shoe 124 is abutting against an end of the rail 123, the movement continues due to the sliding of the shoe 121 fastened rigidly on the wall 512 in the rail 122 adjacent to the shoe 124. The stop position of each gripper 5 is determined by contact of its engagement element 52 with the belt to be grasped. Of course, the stop position of the shoe 121 in the rail 122 defines the maximum stroke of the gripper 5.

Each gripper 5 is therefore moved independently of the others up to its contact with the belt. Thus, when all the grippers 5 are in contact with the belt they will not necessarily be displaced by the same stroke, as a function of the precision of the centering of the transfer ring 1 with respect to the form 2 or possible defects in the belt itself.

The grippers 5 being all in contact with the belt, the maneuvering actuators 152, 152' are actuated and place in motion the clamping plates 151, 151'. The latter axially approach the sidewalls 512 of the grippers 5 for the clamping plates 151 and the sidewalls 514 for the clamping plates 151', up to contact. The two contact surfaces 151" (151") of each clamping plate 151 (151') then cooperate with the corresponding contact surfaces 512" (514") of two consecutive grippers 5 in order thus to effect the blocking by axial clamping of said grippers, as can be noted from FIG. 7.

The form 2 is then deflated and the belt, now held by the transfer ring 1, is transported to the drum 3.

The transfer ring 1 operates to place the belt on the drum 3 in the manner opposite that which takes place for the reverse grasping, that is to say:

When the transfer ring 1 is positioned above the drum 3, the maneuvering actuators 152, 152' are actuated in order to move the clamping plates 151, 151' away from the grippers 5, returning to the grippers their freedom to move radially. The feeding of air to the actuators 8 of the grippers 5 is interrupted and said grippers 5 return to their position of rest due to the return springs 13.

The return movement, guided as previously by the means 12, takes place up to a limit of stroke determined by the stop of the shoulder 513' and 515' of each gripper 5 with the central zone 91 of the corresponding end plate 9.

I claim:

1. A transfer ring for a tire or tire belt, comprising grippers distributed along the circumference of the ring, the grippers having radially extended walls, means for guiding the displacement of the grippers radially to the axis of the ring so as to move the grippers into contact with said tire or belt, means for controlling the radial displacement of said grippers and means movable perpendicular to the radial displacement of the grippers for immobilizing the grippers by blocking the latter, said immobilizing means acting directly on the gripper walls at locations circumferentially adjacent the guide means.

2. A transfer ring according to claim 1, in which the immobilizing means comprise clamping elements for the grippers, distributed in two circumferential sets laterally on both sides of the grippers, the elements of the two sets facing each other, and in which each clamping element is displaceable towards a gripper wall by movement perpendicular to the radial displacement of the latter.

3. A ring according to claim 2, in which the clamping elements are formed by clamping plates.

4. A transfer ring according to claim 3, in which the clamping elements are displaceable axially towards the gripper walls.

5. A transfer ring according to claim 4, in which the grippers each have two opposite lateral walls parallel to the clamping plates, which two opposite lateral walls are directly engaged by surfaces of clamping plates to immobilize the gripper.

6. A transfer ring according to claim 5, in which each of the two walls has two spaced surfaces, each engagable by different circumferentially consecutive clamping plates.

7. A transfer ring according to claim 1, in which the base structure of the transfer ring is formed by two identical, parallel annular disks defining the sidewalls of said ring, held together by connecting rods spaced uniformly on the ring and each end of which is fastened on one of the disks, and in which the grippers and the immobilizing means are mounted on the disks of the transfer ring.

8. A transfer ring according to claim 1, including actuating means for each gripper which imparts to each gripper a radial displacement that is independent for each gripper.

9. A transfer ring according to claim 8, in which said actuating means for the grippers are low pressure actuated.

10. A transfer ring according to claim 9, in which the actuating means are bellows actuators.

11. A transfer ring according to claim 8, in which each gripper is a radially displaceable hollow body defined by radially extended and spaced apart walls and an end wall bearing on the outside an element for the grasping the belt or tire, and in which said end wall is connected on the inside by the actuating means of the gripper to an end plate fastened on the transfer ring.

12. A transfer ring according to claim 11, in which the means for immobilizing the grippers include clamping plates and in which each gripper has two opposite sidewalls parallel to the clamping plates.

13. A transfer ring according to claim 12, in which the height of the sidewalls is greater than the maximum stroke of the grippers.

14. A transfer ring as set forth in claim 1, in which the guide means for the grippers are arranged laterally with respect to the grippers.

15. A transfer ring according to claim 14, in which the immobilizing means include clamping plates and the guide means are arranged between circumferentially adjacent clamping plates.

16. A transfer ring according to claim 14, in which the guide means for the grippers include, for each gripper, at least two rails arranged with their respective end walls side by side, within which there slide a first shoe rigidly fastened on said gripper and a second shoe rigidly fastened on the transfer ring.

17. A transfer ring according to claim 16, in which the immobilizing means include clamping plates and the grippers have two opposite sidewalls parallel to the clamping plates, on each of which the first shoe is fastened.

18. A transfer ring for a tire or tire belt comprising grippers distributed along the circumference of the ring, the grippers being displaceable radially to the axis of the ring so as to come into contact with said tire or belt, means for controlling the radial displacement of said grippers and means moveable perpendicular to the radial displacement of the grippers for immobilizing the grippers, said immobilizing means comprising clamping plates distributed in two circumferential sets laterally on both sides of the grippers, the clamping plates of the two sets facing each other, and in which the clamping plates are axially displaceable towards the grippers by movement perpendicular to the radial displacement of the latter, and in which the grippers comprise two opposite lateral walls parallel to the clamping plates, which two opposite lateral walls are directly engaged by clamping plates to block the gripper, each of the lateral walls being engaged at opposite ends by two circumferentially consecutive clamping plates and each of the clamping plates being engageable with two circumferentially consecutive grippers.

19. A transfer ring for a tire or tire belt comprising grippers distributed along the circumference of the ring and being displaceable radially to the axis of the ring so as to come into contact with said belt or tire, means for controlling the radial displacement of the grippers, clamping plates moveable perpendicular to the radial displacement of the grippers for immobilizing the grippers by direct contact with the grippers and two annular disks defining side walls of the ring and held together by connecting rods spaced between the disks and in which the grippers and the clamping plates are mounted on the disks and the clamping plates are slidably mounted on the connecting rods.

20. A transfer ring according to claim 19, including an actuator for the clamping plate connecting the clamping plate and the corresponding disk.

* * * * *